US008765922B2

(12) United States Patent
Schulz et al.

(10) Patent No.: US 8,765,922 B2
(45) Date of Patent: Jul. 1, 2014

(54) DEVICE AND METHOD FOR SEPARATION OF NEÉL- AND BROWN-MAGNETIC PARTICLES

(75) Inventors: Jürgen Schulz, Jesteburg (DE); Daniel Michalek, Engelskirchen (DE); Dirk Merkel, Solingen (DE); Stefan Miltenyi, Bergisch-Gladbach (DE)

(73) Assignee: Miltenyi Biotec GmbH (DE)

( * ) Notice: Subject to any disclaimer, the term of this patent is extended or adjusted under 35 U.S.C. 154(b) by 429 days.

(21) Appl. No.: 13/277,082

(22) Filed: Oct. 19, 2011

(65) Prior Publication Data

US 2012/0273395 A1 Nov. 1, 2012

(30) Foreign Application Priority Data

Oct. 20, 2010 (DE) ........................ 10 2010 042 723

(51) Int. Cl.
*A23J 1/00* (2006.01)

(52) U.S. Cl.
USPC ................ 530/412; 209/214; 33/195; 267/40

(58) Field of Classification Search
USPC ................ 209/214; 267/40; 530/412; 33/195
See application file for complete search history.

(56) References Cited

U.S. PATENT DOCUMENTS

| | | | | |
|---|---|---|---|---|
| 6,165,663 | A * | 12/2000 | Baba et al. | 430/111.3 |
| 7,071,006 | B2 | 7/2006 | Tajima et al. | |
| 7,716,843 | B2 * | 5/2010 | Healey | 33/195 |
| 2003/0211045 | A1 | 11/2003 | Leszczyznska et al. | |
| 2007/0010702 | A1 * | 1/2007 | Wang et al. | 600/8 |
| 2009/0151176 | A1 | 6/2009 | Healey | |
| 2011/0137018 | A1 * | 6/2011 | Chang-Yen et al. | 530/412 |

FOREIGN PATENT DOCUMENTS

| | | | |
|---|---|---|---|
| DE | 3720844 | A1 | 1/1989 |
| DE | 19800294 | A1 | 7/1999 |
| DE | 10 2006037739 | A1 | 2/2007 |
| DE | 10 2006037739 | B4 | 2/2007 |
| EP | 0 926 496 | A1 | 6/1999 |
| EP | 0 926 496 | B1 | 6/1999 |
| WO | WO-01/10558 | A1 | 2/2001 |

* cited by examiner

*Primary Examiner* — Terrell Matthews
(74) *Attorney, Agent, or Firm* — Morrison & Foerster LLP

(57) ABSTRACT

A method and associated device for enrichment of Neél-magnetic particles from a dispersion of Brown-magnetic particles and Neél-magnetic particles. The device and method use ferromagnetic separation particles having a mean diameter of 100 to 250 μm located in a alternating magnetic field. The ferromagnetic separation particles have a magnetically and chemically inert coating.

10 Claims, 6 Drawing Sheets

DEVICE AND METHOD FOR SEPARATION OF NEÉL- AND BROWN-MAGNETIC PARTICLES

CROSS-REFERENCE TO RELATED APPLICATIONS

This application claims the benefit under 35 U.S.C. §112, §1.53(d) of German application 102010042723.3, filed Oct. 20, 2010, the disclosures of which is incorporated herein by reference in their entirety.

FIELD OF THE INVENTION

This invention is directed to an apparatus and a method for enrichment of Neél-magnetic particles.

BACKGROUND

Magnetic Particle Imaging (MPI) is a promising imaging procedure for medical diagnosis purposes. In MPI, the local concentration of magnetic nano-scale particles is measured quickly and at high precision to calculate an image with high steric resolution. With use of biocompatible nanoparticles, MPI can be utilized for many applications in medicine, such as cardio-vascular diagnosis for arteriosclerotic plaques, or to monitor the blood supply of the heart muscle, or of certain brain areas or the extremities.

In the MPI technique, only the interaction of magnetic particles with an alternating magnetic field contributes to signal generation. To achieve sufficient signal intensity and thus a good image resolution, magnetic particles with a sufficient sensitivity to an alternating magnetic field should be used. Magnetic particles can be distinguished as so called Brown-magnetic particles, which align their steric orientation to an external magnetic field, and so called Neél-magnetic particles which do not align their steric orientation, but do align their magnetic spin to an external magnetic field.

If the external magnetic field is alternating in its direction, magnetic particles will follow the field change either by changing their steric or magnetic spin orientation. At high frequencies above 10 kHz of the alternating magnetic field, only the Neél-magnetic particles are able to follow the field change. Accordingly, only Neél-magnetic particles contribute to signalling in high resolution MPI and preferably magnetic particles with a high proportion of Neél particles in view of Brown particles are utilized in MPI.

It is known to subject magnetic particles to an alternating magnetic field for heating purposes (DE 19800294 A1, US2003/0211045 A1), analysing biochemical molecules on a substrate (DE 10 2006037739A1, EP0926496 B1) or separating magnetic particles from a suspension (US 2009/0151176 A1) all incorporated herein by reference in their entireties. For the teachings of these publications, the differences between Neél- and Brown magnetic particles is not of concern. Accordingly, separation of Brown- and Neél-magnetic particles is not disclosed.

The use of Neél-magnetic particles for MPI and a procedure for the enrichment of Neél-magnetic particles is known and described, for example, in patent publication WO 01/10558 A1, also incorporated by reference in its entirety. This publication discloses a device for the separation of Neél- and Brown-magnetic particles using an alternating magnetic field. The alternating magnetic field operates at a frequency of 1 mHz to 100 GHz and the magnetic particles have a size of 0.1 nm to 100 μm. To enhance the alternating magnetic field, WO 01/10558 A1 proposes introducing spherical separation particles into the magnetic field. However, spherical separation particles result in such a high magnetic gradient that both Neél- and Brown-magnetic particles are immobilized by the alternating magnetic field and the separation of the particles is not satisfactory. Furthermore, the particles immobilized at the proposed separation particles are difficult to be removed from separation particles, which is attributed to the material used in WO 01/10558 A1.

SUMMARY

A goal of the invention is therefore to improve the separation or at least the enrichment of Neél-magnetic particles from a mixture of Neél- and Brown-magnetic particles, using a new device.

Surprisingly, it was found that the separation of Neél- and Brown-magnetic particles can be improved by directing a dispersion of such particles in an alternating magnetic field over coated separation particles.

It is a first goal to provide such a device for enrichment of Neél-magnetic particles from a dispersion of Brown-magnetic particles and Neél-magnetic particles, the device using ferromagnetic separation particles having a mean diameter $d_{50}$ of 100 to 250 μm located in an alternating magnetic field, wherein the ferromagnetic separation particles have a magnetically and chemically inert coating.

Another goal is to provide an associated process for enrichment of Neél-magnetic particles from a dispersion of Brown-magnetic particles and Neél-magnetic particles by directing the dispersion at least once over ferromagnetic separation particles with a mean diameter $d_{50}$ of 100 to 250 μm in an alternating magnetic field, thereby immobilizing the Neél-magnetic particles at the ferromagnetic separation particles, wherein the ferromagnetic separation particles have a magnetically and chemically inert coating.

The magnetically and chemically inert coating of the ferromagnetic separation particles has no or substantially no impact on their magnetic properties and does not interact or react with the dispersant or the magnetic particles. The coating is not soluble or dispersable in the dispersant and/or does not contain any biological active molecule such as DNA, RNA, antibodies or affinity binding systems like biotin.

With the process and device in accordance with the invention, it is possible to separate or at least enrich particles having Neél-magnetic properties from a suspension or dispersion of a mixture of Neél- and Brown-magnetic magnetic particles.

The target dispersion or fraction may be recovered by switching off or shutting down the alternating magnetic field. Without the magnetic field, the Neél-magnetic particles are no longer immobilized and can be rinsed from the separating particles.

In another embodiment, the coated separation particles with the Neél-magnetic particles immobilized thereon are removed from the alternating magnetic field, and the Neél-magnetic particles are eluted from the coated separation particles to obtain a target dispersion or fraction including only Neél-magnetic particles, or at least being enriched in terms Neél-magnetic particles.

If the desired enrichment of Neél-magnetic particles is achieved, an optional washing process, for example using buffer solution as known to the skilled artesian, can be performed before recovery of the Neél-magnetic particles into the target dispersion or fraction.

The process according to the invention is especially useful for enrichment of Neél-magnetic particles having a size (mean diameter $d_{50}$) in the range of 30 to 100 nm Neél-magnetic particles having this dimension are suitable for MPI, because they are small enough to be introduced into the human body and are able to follow the alternating magnetic field by changing the orientation of their magnetic spin.

In the method in accordance with the invention, a suspension or dispersion of magnetic particles (i.e. a mixture of Neél and Brown-magnetic particles) is fractionated in a flow-through system for example in, the form of a conventional column or a tube which is filled with the coated ferromagnetic separation particles and placed in a alternating magnetic field. The Neél-magnetic particles are immobilized at the separation particles by the alternating magnetic field whereas the Brown-magnetic particles are not held back and can be discharged.

In one embodiment, the suspension or dispersion of magnetic particles can be directed once or up to 25 times, such as between 1 and 10 times, through an alternating magnetic field using the coated ferromagnetic separation particles. For this purpose, conventional pumping and steering mechanism are provided. The process may be performed continuously or batch-wise. Continuous processing may be performed by either directing the suspension or dispersion of magnetic particles in cascades through a plurality (e.g., 1 to 25) of such devices or alternating magnetic fields using ferromagnetic separation particles or by continuously directing the suspension or dispersion in several runs (e.g., 1 to 25) through one device or alternating magnetic field having ferromagnetic separation particles, in a closed loop.

The device in accordance with the invention may be operated in a closed or open mode. In a closed system, an appropriate number of intermediate or buffer reservoirs and valves for directing the liquids are provided.

Thereby, it is possible at least to enrich Neél-magnetic particles from a dispersion of a mixture of Neél and Brown magnetic particles. At best, the Neél-magnetic particles are separated from the mixture entirely or the target fraction does not contain any Brown-magnetic particles. The enrichment of Neél-magnetic particles from any dispersion is preferably performed to achieve a fraction with at least a 2-fold, more preferable at least 10-fold and especially at least 100-fold concentration of Neél-magnetic particles with respect to the concentration of Neél-magnetic particles of the original dispersion.

If the present process is performed in a plurality of cycles—either in a plurality of devices or magnetic fields or in a plurality of loops through the same device or magnetic field—the concentration of Neél-magnetic particles may be enhanced at every cycle by these factors.

In another embodiment, it is possible to further concentrate the target fraction of Neél-magnetic particles. For this purpose, the target fraction enriched in Neél-magnetic particles is directed through a static magnetic field, thereby immobilizing all the magnetic particles (especially the Neél-magnetic particles) and separating the magnetic particles at least in part from the dispersant.

In this embodiment, the gradient of the static magnetic field can be enhanced by introducing ferromagnetic separation bodies into the magnetic field, for example using LD, LC, MC columns of the type available from Miltenyi Biotec GmbH of Germany. After optional washing, the immobilized Neél-magnetic particles are removed with the ferromagnetic separation bodies from the static magnetic field and eluted using an appropriate dispersant. With this additional process step, the concentration of Neél-magnetic particles in the target fraction or dispersion is enhanced, without improving their purity with respect of Brown-magnetic particles.

Brown and Neél-magnetic particles can be separated in an alternating magnetic field with a frequency of greater than 10 kHz, because the Brown-magnetic particles are not able to align their steric orientation with the direction of the alternating magnetic field. Neél-magnetic particles do not align their steric orientation, but instead align their magnetic spin with the alternating magnetic field, resulting in a much shorter relaxation time. Brown-magnetic particles have a relaxation constant of about $10^{-4}$/sec, whereas Neél-magnetic particles have a relaxation constant of about $10^{-9}$/sec.

The device and process of the invention preferably utilize an alternating magnetic field with a frequency of 40 to 200 kHz, especially 70 to 100 kHz. The generation of such high-frequency (HF) alternating magnetic fields is known. HF fields can be conventionally coupled with a ferrite core into the present device.

The alternating magnetic field should have a magnetic gradient high enough for the intended separation of Neél and Brown-magnetic particles. However, too high a gradient is disadvantageous since the Brown-magnetic particles may be immobilized besides the Neél-magnetic particles and the separation becomes poor.

The present separation particles are intended to generate the appropriate magnetic gradient for separation of Neél- and Brown-magnetic particles in an alternating magnetic field. Especially useful are ball-shaped separation particles, preferably having a mean diameter $d_{50}$ of 100 to 250 μm, preferably 180 to 220 μm (for the coated particle). In one embodiment, the ferromagnetic separation particles consist of ferrites, preferably magnetically soft ferrites, and especially MnZn-ferrites.

The magnetically and chemically inert coating on the separation particles includes or consists of an organic lacquer such as epoxy resin or an inorganic coating such as silicon dioxide ($SiO_2$). The thickness of the coating is between 1 and 25 μm, preferably between 1 and 10 μm and especially between 3 and 7 μm. The present coating of the separation particles results in a magnetic gradient adjusted to separate the Neél- and Brown-magnetic particles in the present device and in addition, the Neél-magnetic particles can be rinsed more easily from coated than uncoated separation particles.

Coating of the ferromagnetic separation particles can be performed in a through-flow process, for example in a conventional column or a tube. The desired thickness of the coating may be adjusted by subsequent centrifugation, thereby stripping superfluous material. A suitable coating procedure is disclosed for example in German patent document DE 03720844 C2 incorporated herein by reference in its entirety.

DETAILED DESCRIPTION

Figure 1:
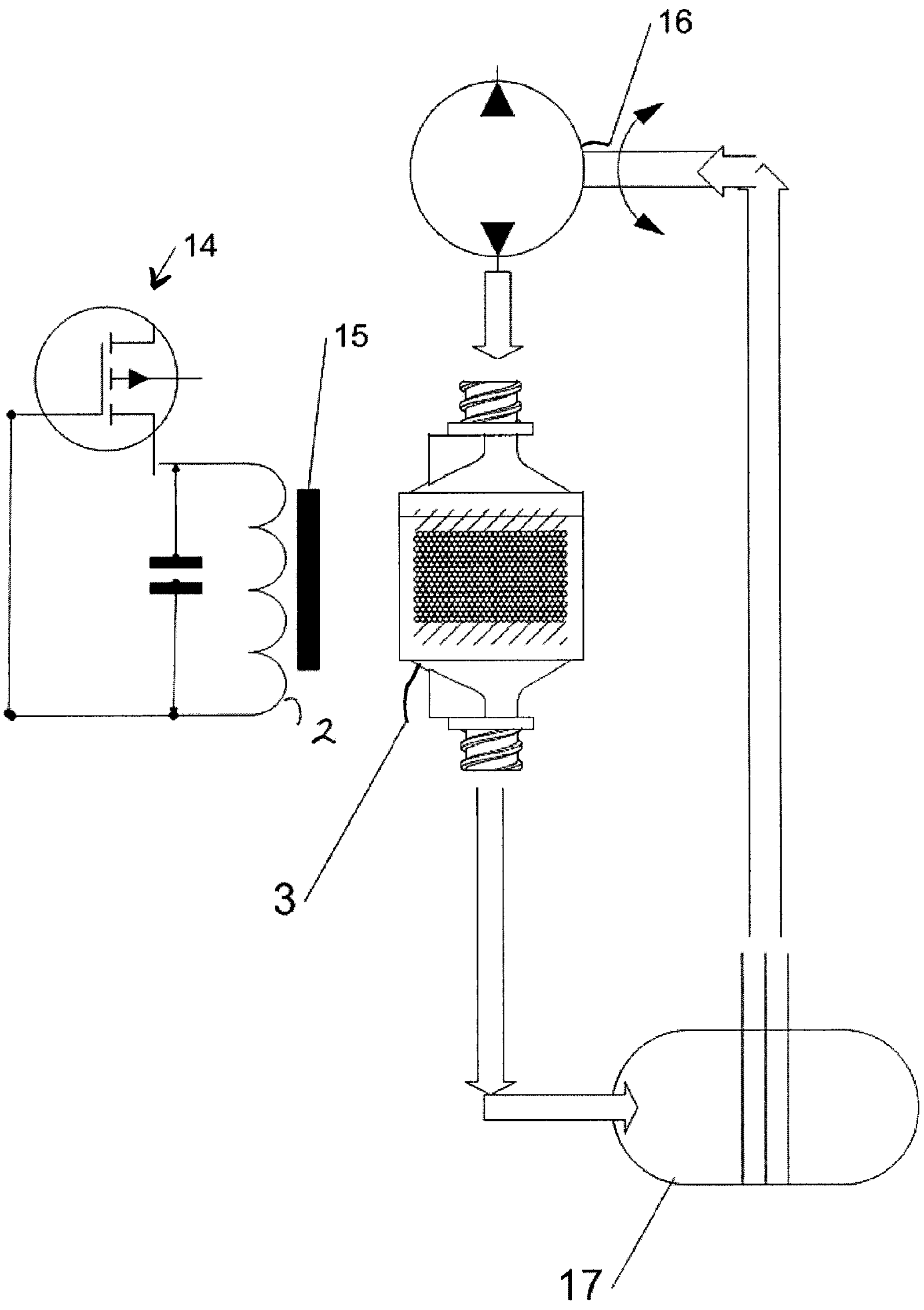
FIG. 1 shows the present separation device (apparatus).

FIG. 1 shows by way of example a device in accordance with the invention with separation column 3 filled with ball-shaped separation particles consisting of ferrite with a mean diameter $d_{50}$ of 100 to 150 μm (including the coating). The separation particles are coated with an organic lacquer having a thickness of about 5 μm.

The alternating magnetic field having a frequency of 80 kHz to immobilize the Neél-magnetic particles on the separation particles is produced by conventional HF generator 14, including its associated circuitry. The alternating magnetic field is coupled via conventional ferrite core 15 into separation column 3. Reservoir 17 provides a dispersion of magnetic particles (a mixture of Brown and Neél-magnetic particles) which is directed continuously by pump 16 through separation column 3 and over the separation particles in the direction indicated by the arrows.

The Neél-magnetic particles are recovered after first washing the separation column 3 and the separation particles to remove undesired Brown-magnetic particles under an activated alternating magnetic field (i.e. HF generator 14 is switched on). Then, HF generator 14 is switched off, i.e. the alternating magnetic field is deactivated. The immobilized Neél-magnetic particles are now rinsed from separation column 3 and the separation particles, for example using a commercial available phosphate buffer.

The device shown allows quasi-continuous separation of Brown- and Neél-magnetic particles since the dispersion can be directed through separation column 3 in a closed loop. The Neél-magnetic particles are held back in the separation column 3 by the alternating magnetic field and are depleted from the dispersion, whereas the Brown-magnetic particles are enriched in the dispersion. After deactivation (switching off) of the alternating magnetic field, the Neél-magnetic particles can be rinsed from the separation column 3 and the separation particles. In an alternative, the separation column 3 can be removed from the alternating magnetic field for rinsing of the Neél-magnetic particles.

Figure 2A:
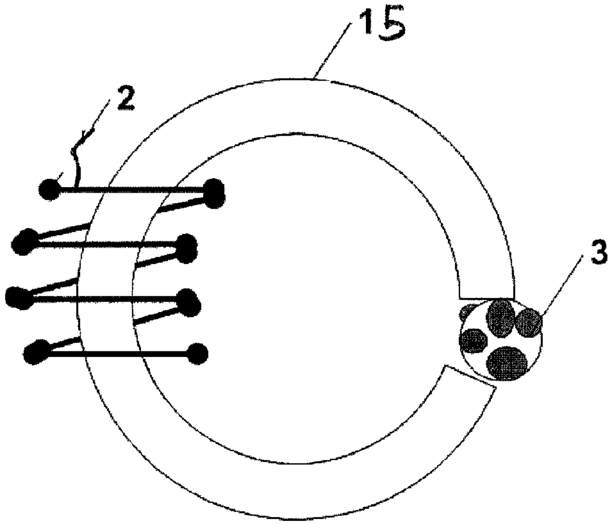
FIGS. 2*a*, 2*b* show detail of FIG. 1.

In FIG. 2*a*, detail of components to perform the present method of the invention are shown. The alternating magnetic field is coupled via solenoid (coil) 2 into ferrite core 15, thereby inducing an alternating magnetic field into separation column 3.

Figure 2B:
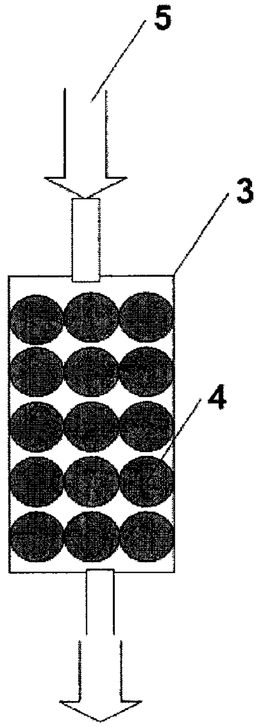

FIG. 2*b* shows part of FIG. 2*a* in detail, with separation column 3 filled with coated ball-shaped separation particles 4. A dispersion 5 of magnetic particles comprising a mixture of Brown and Neél-magnetic particles is directed through separation column 3. By activating the alternating magnetic field, only the Neél-magnetic particles are immobilized at the separation particles 4, and not or only to a minor extent, the Brown-magnetic particles.

Figure 3:
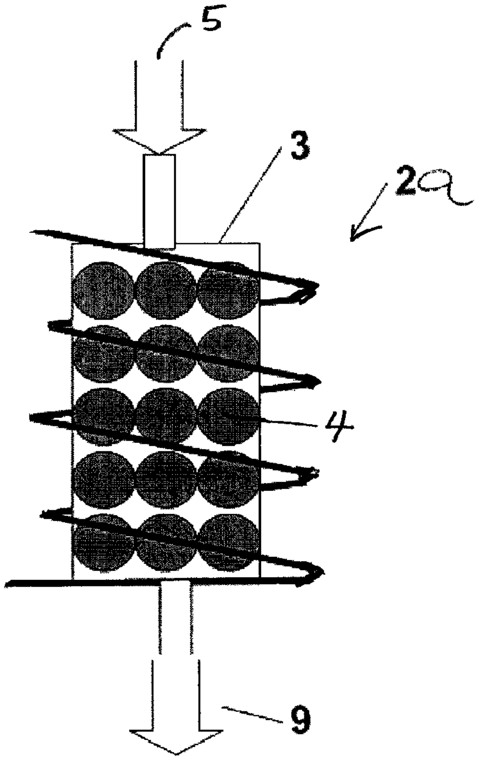
FIGS. 3 and 4 show operation of the FIG. 1 device.

In FIG. 3, the first step of the present method is shown. Dispersion 5 comprising a mixture of Brown and Neél-magnetic particles is directed through the alternating magnetic field 2*a* inside of which is separation column 3 and separation particles 4. The Neél-magnetic particles are immobilized at the ball-shaped separation particles 4, thereby depleting the eluate 9 from the Neél-magnetic particles.

Figure 4:
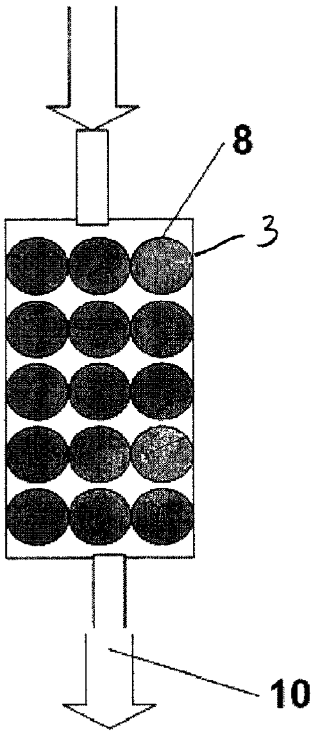

FIG. 4 depicts the elution process of the Neél-magnetic particles, wherein a buffer, preferably with a high flow rate, is used to recover the Neél-magnetic particles from the solution separation particles 8 in the form of dispersion 10. Dispersion 10 is enriched in terms of the Neél-magnetic particles as compared to the original dispersion 5 comprising the Brown and Neél-magnetic particles.

Figure 5:
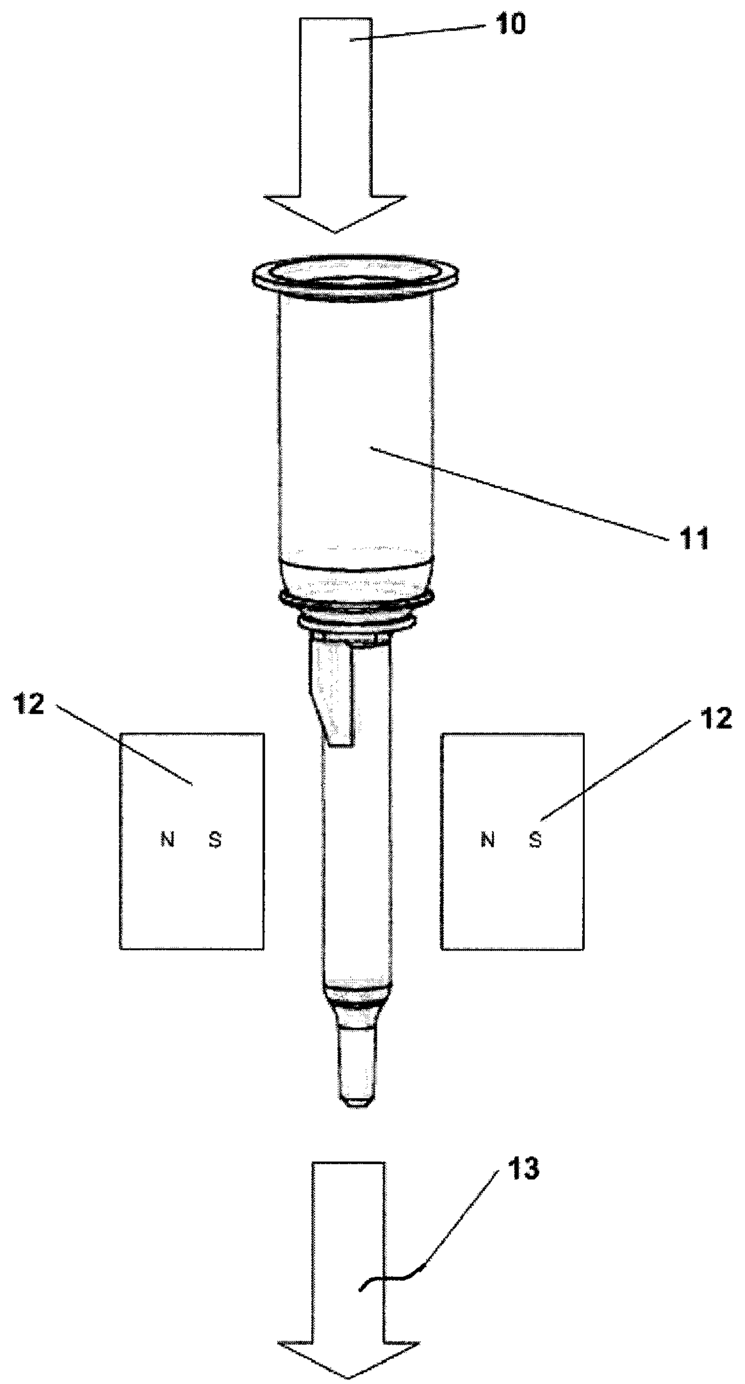
FIG. 5 shows a subsequent separation process.

FIG. 5 shows the optional subsequent enrichment process to obtain dispersion 13 comprising the Neél-magnetic particles in high concentration. In this embodiment, the concentration of Neél-magnetic particles in dispersion 10, produced with the present method is raised by removing substantially any magnetic particle from the dispersant 10 and re-dispersing the obtained particles in the desired amount and type of dispersant.

The separation of magnetic particles from dispersion 10 can be achieved with a static magnetic field, for example with a permanent magnet 12 having north (N) and south (S) poles. The separation is enhanced by using separation aids 11 for magnetic sorting, such as a separation column of type LD, LC or MC available from Miltenyi Biotec GmbH. Substantially any magnetic particle is immobilized by the static magnetic field in separation column 11, whereas the dispersant and the non-immobilized particles can be discharged. Then, separation column 11 is removed from the static magnetic field (i.e. of permanent magnet 12) and the Neél-magnetic particles are rinsed from the separation column 11 with the desired dispersant to obtain target dispersion 13. The dispersant of the starting dispersion 10 and the target dispersion 13 may be the same or different.

With the present method and device, magnetic particles of the described size can be separated into fractions of Neél- and Brown-magnetic particles. The magnetic particles are preferably dispersed or suspended in liquids or buffer systems commonly used for living cells, such as phosphate buffer.

Suitable particles as starting material for the separation particles for the present process are, for example, MACS® MicroBeads, developed by Miltenyi Biotec GmbH for magnetic cell sorting. MACS® MicroBeads are nano-scale particles having a paramagnetic core in a biocompatible shell, making them easily dispersible in water or in buffer systems used in biological research.

As shown in the following example, dispersions of magnetic particles can be effectively separated into fractions enriched in terms of Neél- and respectively Brown-magnetic particles with the present method. The separation was performed on a device according to FIG. 1.

EXAMPLE

A dispersion of magnetic particles was directed with a flow rate of 0.5 ml/sec through a separation column filled with ball-shaped ferromagnetic separation particles consisting of MnZn-ferrites coated with an epoxy resin lacquer having a thickness of about 5 μm. The separation particles had a mean diameter $d_{50}$ including the coating of about 200 μm. The column holding the separation particles was located in an alternating magnetic field having an strength of about 20 mT at a frequency of about 80 kHz.

The measurement of the magnetic properties of the particles and the magnetic field was carried out using a commercial magneto spectrometer.

The dispersion of magnetic particles was directed three times in a closed loop through the separation column. After the alternating magnetic field was switched off, the magnetic particles immobilized on the separation particles were rinsed with a phosphate buffer solution to obtain a dispersion enriched in Neél-magnetic particles. The original dispersion was accordingly depleted in terms of Neél-magnetic particles and enriched in terms of Brown-magnetic particles.

The dispersion enriched in Neél-magnetic particles was compared with the original dispersion and with the dispersion depleted in Neél-magnetic particles in terms of their magnetic properties.

Figure 6:
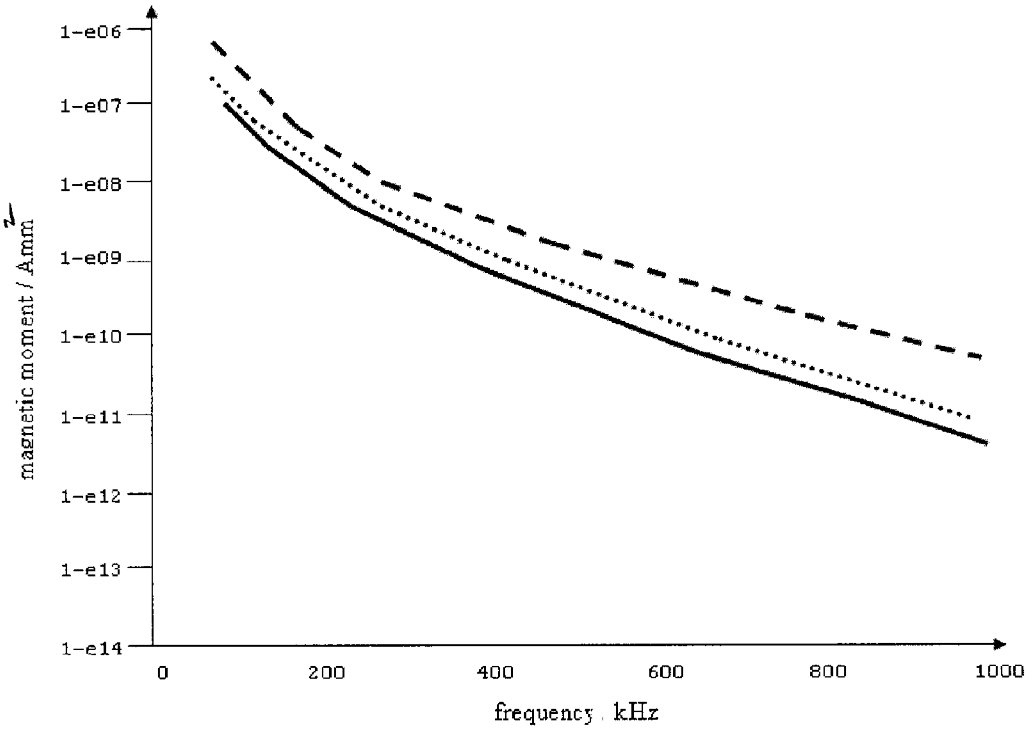
FIGS. 6, 7, 8, 9 and 10 show graphs of magnetic moment vs. magnetic field frequency.

In FIG. 6, the magnetic properties (vertical axis) of the original dispersion and the dispersion enriched in Neél-magnetic particles are shown as a plot in a frequency range (horizontal axis) of 0 to 1000 kHz. As a reference, "Resovist" from Bayer Schering Pharma GmbH, a commercial available contrast material for Magnetic Resonance Tomography (MRT) was used. (Magnetic Resonance Tomography (MRT) operates with a different technical concept.) The fraction or dispersion obtained with the present method (upper plot, broken line) has a higher signal amplitude as compared with Resovist (dotted line) or the original dispersion (continuous line).

Figure 7:
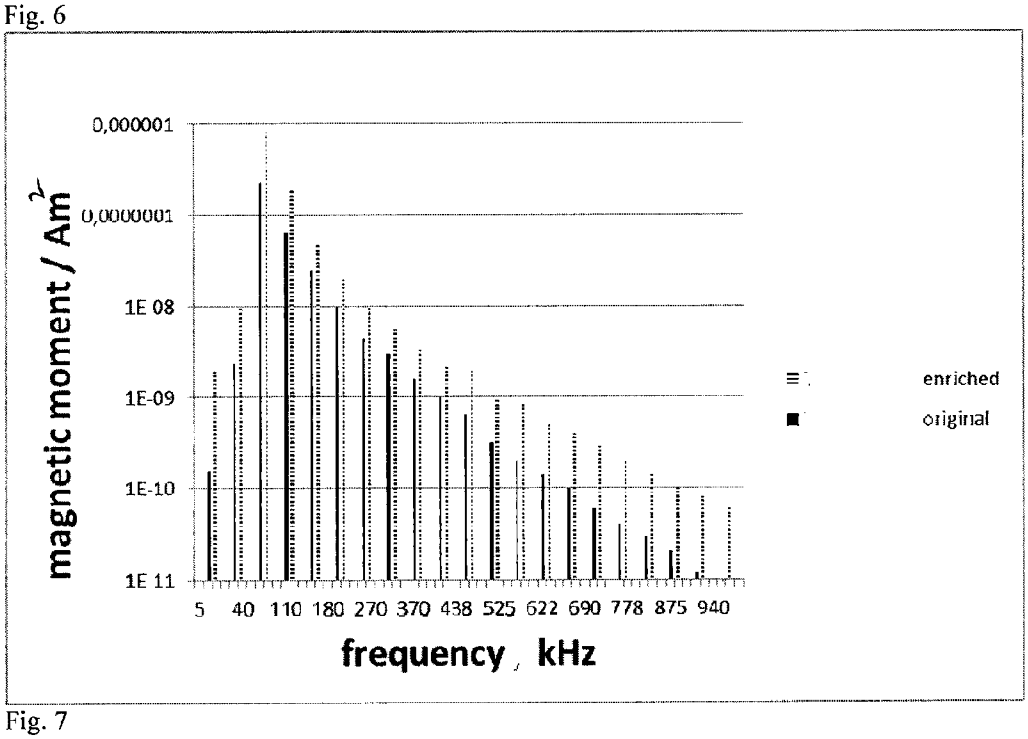
Figure 8:
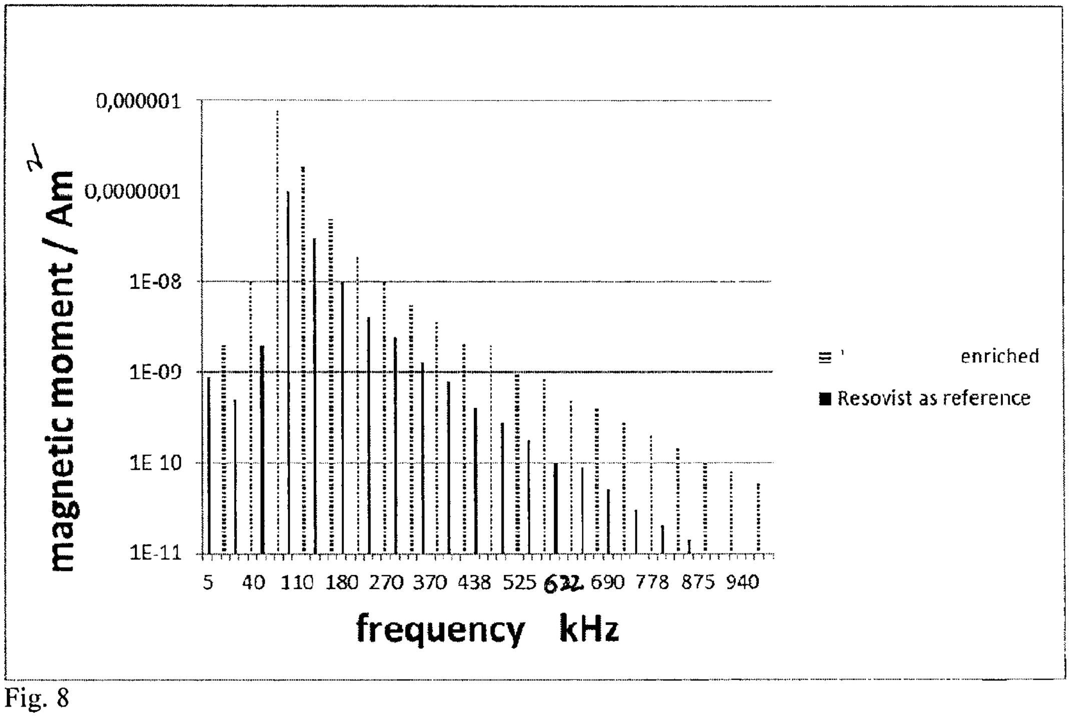

Furthermore, the dispersion obtained in accordance with the invention has a broader resonance spectrum of frequencies. FIG. 7 is a bar graph of the frequency spectra (horizontal axis) of a 10 ml sample of a fraction of magnetic particles enriched in Neél-magnetic particles (dotted line) as compared with the original dispersion (continuous line). The fraction of magnetic particles enriched in Neél-magnetic particles has not only higher signal amplitudes (vertical axis) than the original dispersion, but also a wider spectrum of resonance. In FIG. 8, a dispersion enriched in Neél-magnetic particles (dotted lines) is compared graphically in its magnetic features to a dispersion of Resovist (continuous lines). Again, the dispersion obtained with the present method and device has a higher signal amplitude and a broader spectrum of resonance. Accordingly, the fraction or dispersion obtained with the present method has a higher concentration of Neél-magnetic particles than the original dispersion or Resovist and has suitable magnetic properties for use in MPI.

Figure 9:
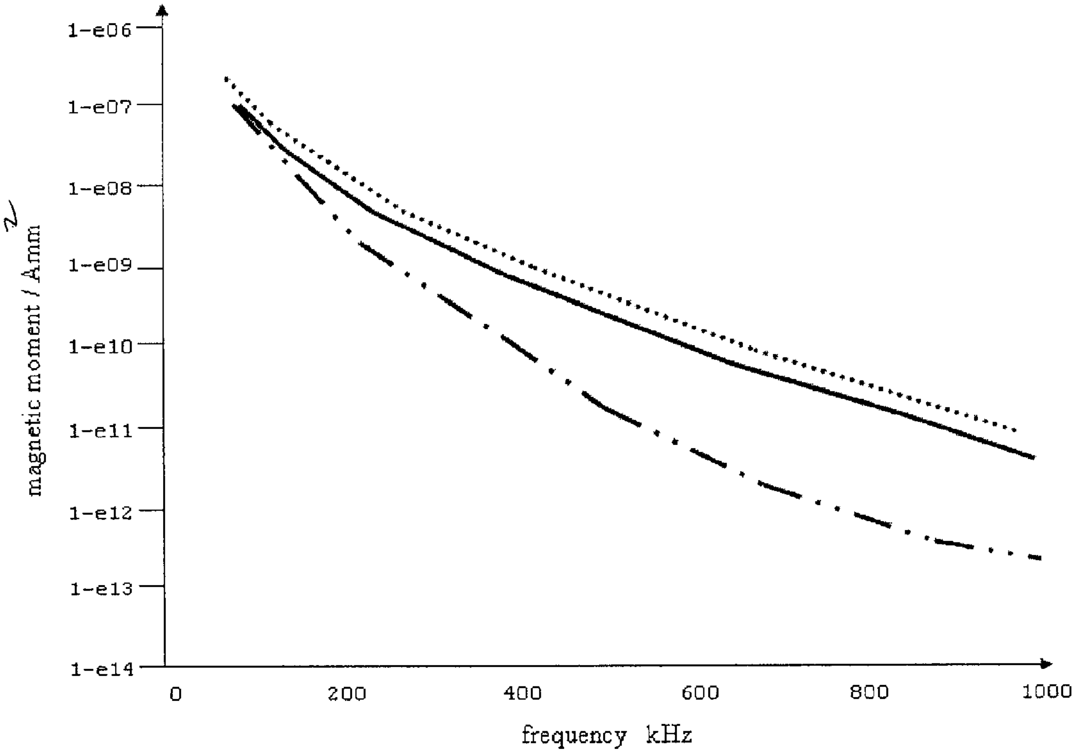

As a cross check, plots of the magnetic properties (vertical axis) of the discharged fraction are shown in FIG. 9 at a frequency range (horizontal axis) of 0 to 1000 kHz. The fraction depleted in terms of Neél-magnetic particles (broken line) has a lower signal amplitude compared to Resovist (dotted line) or the original dispersion (continuous line). Accordingly, this fraction or dispersion is depleted in terms of Neél-magnetic particles and enriched in Brown-magnetic particles and not suitable for use in MPI.

Comparative Example

A dispersion of magnetic particles was subjected to the present method and the device as described in the above example, with the exception of using here uncoated separation particles.

Figure 10:
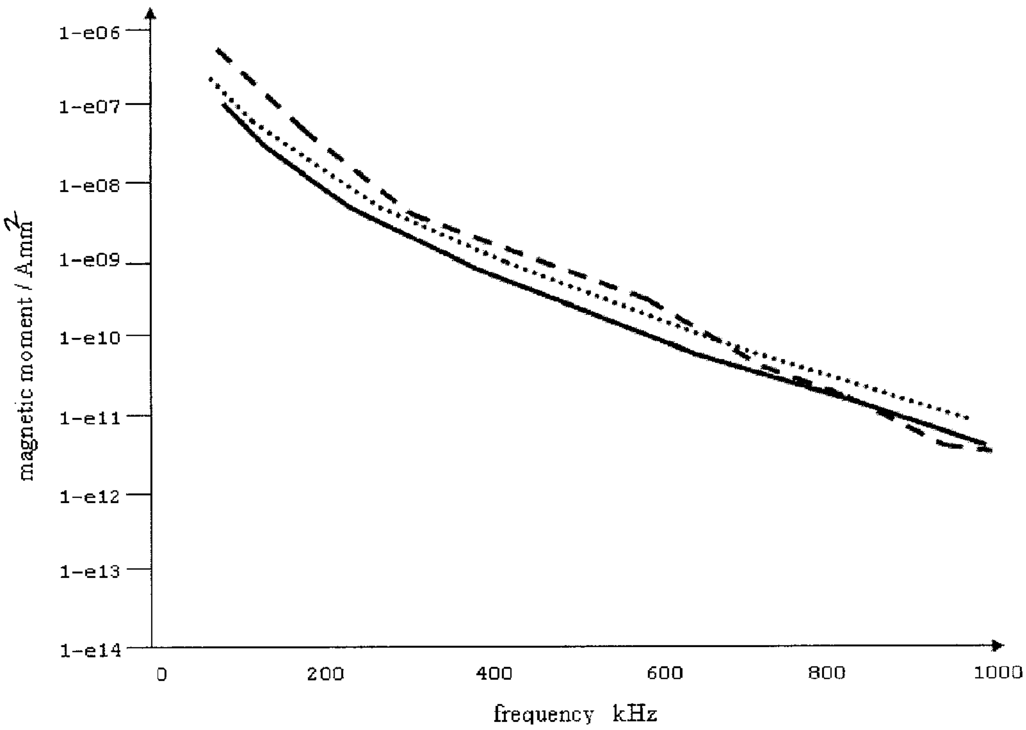

FIG. 10 shows graphically the magnetic properties of the target fraction (broken line) in comparison to "Resovist" (dotted line) and the starting material (continuous line). Unlike in FIG. 9, here the fraction obtained had only slightly different magnetic properties than the original dispersion, indicating that no or only a small amount of Neél-magnetic particles were immobilized at the uncoated separation particles by the alternating magnetic field.

Accordingly, the fraction or dispersion obtained without using coated separation particles (i.e. not according to the invention) has no improved magnetic properties in view of the original material and is not suitable for use in MPI.

The invention claimed is:

1. A device for enrichment of Neél-magnetic particles from a dispersion of Brown-magnetic particles and Neél-magnetic particles, comprising:

a column holding ferromagnetic separation particles having a mean diameter of 100 to 250 μm; and an electromagnetic element which generates an alternating magnetic field, wherein the column is located in the alternating magnetic field; and wherein the separation particles have a magnetically and chemically inert coating.

2. A device according to claim 1, wherein the inert coating has a thickness in the range of 1 to 25 μm.

3. A device according to claim 1, wherein the inert coating includes an organic lacquer or an inorganic material.

4. A device according claim 1, wherein the electromagnetic element generates an alternating magnetic field which has a frequency in the range of 40 to 200 kHz.

5. A method for enrichment of Neél-magnetic particles from a dispersion of Brown-magnetic particles and Neél-magnetic particles, comprising the acts of:

directing the dispersion at least once over ferromagnetic separation particles having a mean diameter in the range of 100 to 250 μm; and applying an alternating magnetic field to the dispersion, thereby immobilizing the Neél-magnetic particles at the separation particles; wherein the separation particles have a magnetically and chemically inert coating.

6. A method according to claim 5, wherein the inert coating has a thickness in the range of 1 to 25 μm.

7. A method according to claim 5, wherein the inert coating includes an organic lacquer or an inorganic material.

8. A method to claim 5, wherein the act of directing is repeated at least once over the separation particles and through the alternating magnetic field.

9. A method according to claim 5, further comprising the acts of:

removing the separation particles with the Neél-magnetic particles immobilized thereon from the alternating magnetic field; and eluting the Neél-magnetic particles from the separation particles thereby to obtain a dispersion enriched in Neél-magnetic particles.

10. A method according to claim 9, further comprising the act of directing the enriched dispersion through a static magnetic field, thereby immobilizing and separating the Neél-magnetic particles.

* * * * *